(12) United States Patent
Rezaei et al.

(10) Patent No.: US 9,798,801 B2
(45) Date of Patent: Oct. 24, 2017

(54) OBSERVATION-BASED QUERY INTERPRETATION MODEL MODIFICATION

(71) Applicant: Microsoft Technology Licensing, LLC, Redmond, WA (US)

(72) Inventors: Pedram Faghihi Rezaei, Seattle, WA (US); Christopher A. Hays, Monroe, WA (US); Amir M. Netz, Bellevue, WA (US); Patrick J. Baumgartner, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 431 days.

(21) Appl. No.: 14/333,128

(22) Filed: Jul. 16, 2014

(65) Prior Publication Data

US 2016/0019292 A1 Jan. 21, 2016

(51) Int. Cl.
*G06F 17/30* (2006.01)

(52) U.S. Cl.
CPC .. *G06F 17/30684* (2013.01); *G06F 17/30401* (2013.01); *G06F 17/30696* (2013.01); *G06F 17/30864* (2013.01)

(58) Field of Classification Search
CPC ......... G06F 17/30864; G06F 17/30684; G06F 17/30401; G06F 17/30696
See application file for complete search history.

(56) References Cited

U.S. PATENT DOCUMENTS

| | | | |
|---|---|---|---|
| 5,454,106 A | 9/1995 | Burns et al. | |
| 6,766,320 B1 | 7/2004 | Wang et al. | |
| 7,596,558 B2 | 9/2009 | Brewer et al. | |
| 8,190,627 B2 | 5/2012 | Platt et al. | |
| 8,438,142 B2 | 5/2013 | Wu et al. | |
| 2003/0069880 A1 | 4/2003 | Harrison et al. | |
| 2003/0217052 A1* | 11/2003 | Rubenczyk | G06F 17/30643 |

(Continued)

FOREIGN PATENT DOCUMENTS

WO 2014014745 A2 1/2014

OTHER PUBLICATIONS

"Second Written Opinion Issued in PCT Application No. PCT/US2015/040085", Mailed Date: Jun. 8, 2016, 8 Pages.

(Continued)

*Primary Examiner* — Shiow-Jy Fan
(74) *Attorney, Agent, or Firm* — Workman Nydegger

(57) ABSTRACT

The modifying of a natural language interpretation model for interpreting natural language queries. The system discovers modifications that one or more queriers made to one or more original query results of one or more natural language queries to generate one or more modified query results. The system then uses the discoveries to identify one or more changes to a natural language interpretation model that would result (given the same natural language queries) in one or more query results that more accurately reflect the one or more modified query results. The system the causes the natural language interpretation model to be modified with at least one of the one or more identified changes. Accordingly, over time, the natural language interpretation model may learn from observations of its own performance.

19 Claims, 5 Drawing Sheets

(56) References Cited

U.S. PATENT DOCUMENTS

| | | | |
|---|---|---|---|
| 2005/0043940 A1* | 2/2005 | Elder | G06F 17/3043 |
| | | | 704/9 |
| 2005/0050042 A1* | 3/2005 | Elder | G06F 17/3043 |
| 2005/0289123 A1* | 12/2005 | Dettinger | G06F 17/30864 |
| 2007/0106499 A1* | 5/2007 | Dahlgren | G06F 17/30401 |
| | | | 704/10 |
| 2009/0083226 A1 | 3/2009 | Kawale et al. | |
| 2009/0192985 A1 | 7/2009 | Bolls et al. | |
| 2010/0274804 A1* | 10/2010 | Muskal | G06F 17/30864 |
| | | | 707/769 |
| 2013/0159222 A1 | 6/2013 | Blanco et al. | |
| 2014/0379753 A1* | 12/2014 | Roit | G06F 17/3043 |
| | | | 707/771 |

OTHER PUBLICATIONS

"International Search Report & Written Opinion Received for PCT Application No. PCT/US2015/040085", Mailed Date: Nov. 19, 2015, 13 Pages.

Glover, et al., "Improving Category Specific Web Search by Learning Query Modifications", In Proceedings of Symposium on Applications and the Internet, Jan. 8, 2001, 9 pages.

Heyer, et al., "Tibianna: A Learning-Based Search Engine with Query Refinement", In Proceedings of the 7th Australasian Document Computing Symposium, Dec. 16, 2012, 4 pages.

"International Preliminary Report on Patentability Issued in PCT Application No. PCT/US2015/040085", Mailed Date: Oct. 6, 2016, 9 Pages.

* cited by examiner

OBSERVATION-BASED QUERY INTERPRETATION MODEL MODIFICATION

BACKGROUND

Computing systems and associated networks have revolutionized the way human beings work, play, and communicate. Nearly every aspect of our lives is affected in some way by computing systems. The proliferation of networks has allowed computing systems to share data and communicate thereby vastly increasing information access. For this reason, the present age is often referred to as the "information age".

One key technology that facilitates access to information is the database. A query is a formalized request to access information from the database. Often queries are issued against one or more or all tables of a database using a defined query language having defined query semantics (often referred to as a structured query). In order to allow more natural human access to such databases, natural language query technology has developed in which uses may use more natural language queries (at least compared to structured queries). The natural language queries are then subject to a natural language interpretation model (which may include one or both of syntactic and semantic models) to thereby formulate an estimate of a corresponding structured query.

The nuances of human language have made the problem of converting natural human language into computer-interpretive form a difficult problem to resolve, even for modern technology. Often, natural language interpretation models provide results that do not exactly match the intent of the user, causing the querier to modify the query results to reflect a more desired result. This might be because the natural language interpretation model simply does not understand the semantics and the syntax intended for the natural language query.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to modifying a natural language interpretation model for interpreting natural language queries. The system discovers one or more modifications that one or more queriers made to one or more original query results of one or more natural language queries to generate one or more modified query results. The system uses the discoveries to identify one or more changes to a natural language interpretation model that would result in one or more query results that more accurately reflect the one or more modified query results. The system causes the natural language interpretation model to be modified with at least one of the one or more identified changes. Accordingly, over time, the natural language interpretation model may learn from observations of its own performance.

In some embodiments, changes made to the natural language interpretation model may be made per querier or per query group, to thereby adjust to the custom and natural language of that querier or query group. Evidence thresholds used to make certain changes to the natural language interpretation model may differ depending on a confidence in the portion that would be changed of the natural language interpretation model.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

At least some embodiments described herein relate to modifying a natural language interpretation model for interpreting natural language queries. The system discovers one or more modifications that one or more queriers made to one or more original query results of one or more natural language queries to generate one or more modified query results. The system uses the discoveries to identify one or more changes to a natural language interpretation model that would result in one or more query results that more accurately reflect the one or more modified query results. The system causes the natural language interpretation model to be modified with at least one of the one or more identified changes. Accordingly, over time, the natural language interpretation model may learn from observations of its own performance.

In some embodiments, changes made to the natural language interpretation model may be made per querier or per query group, to thereby adjust to the custom and natural language of that querier or query group. Evidence thresholds used to make certain changes to the natural language interpretation model may differ depending on a confidence in the portion that would be changed of the natural language interpretation model.

Some introductory discussion of a computing system will be described with respect to FIG. 1. Then, the modifications of the natural language interpretation model will be described with respect to subsequent drawings.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

Figure 1:
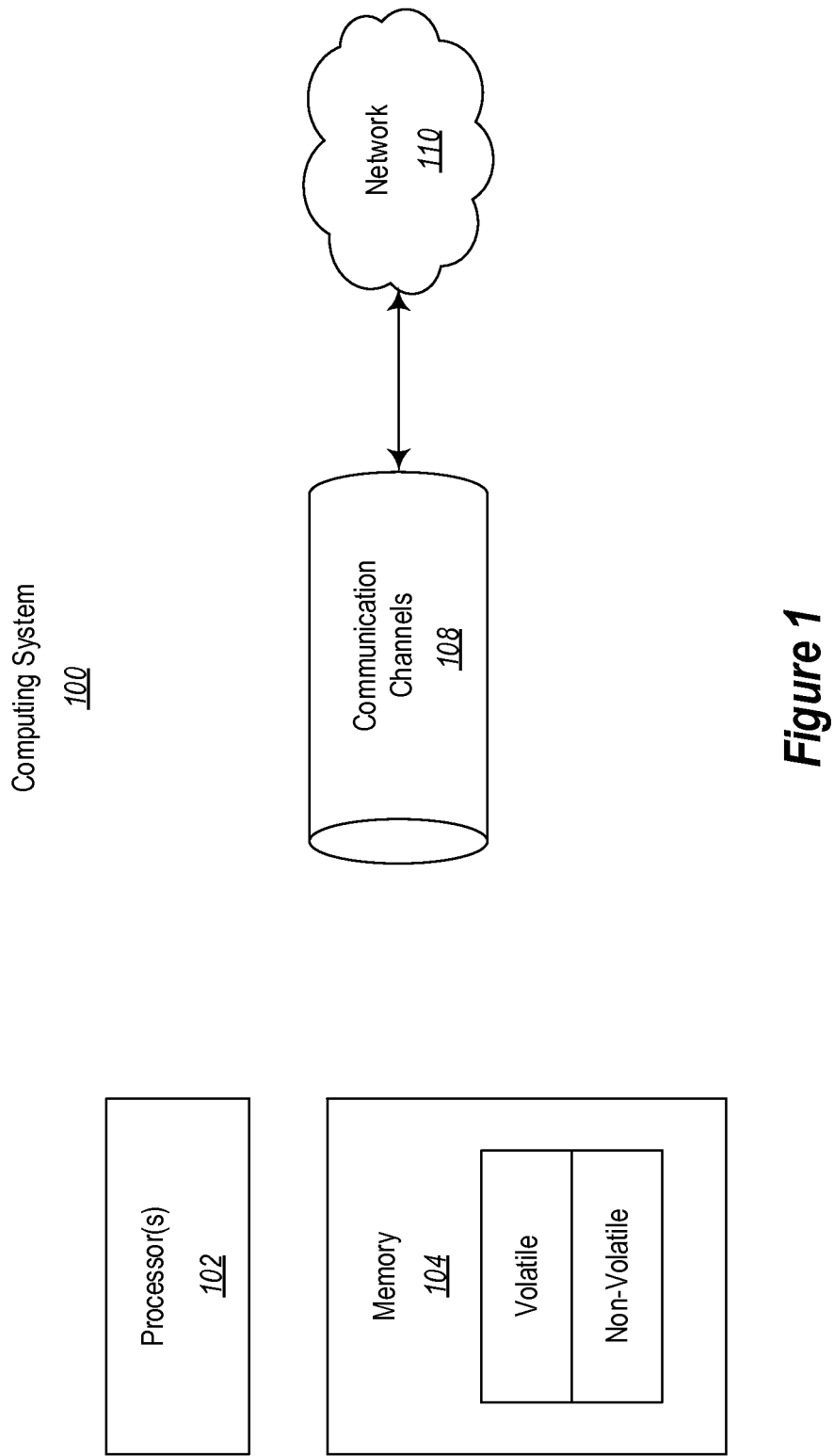
FIG. 1 abstractly illustrates a computing system in which some embodiments described herein may be employed.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routings, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110. The computing system 100 also includes a display, which may be used to display visual representations to a user.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries or even instructions that undergo some translation (such as compilation) before direct execution by the processors, such as intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
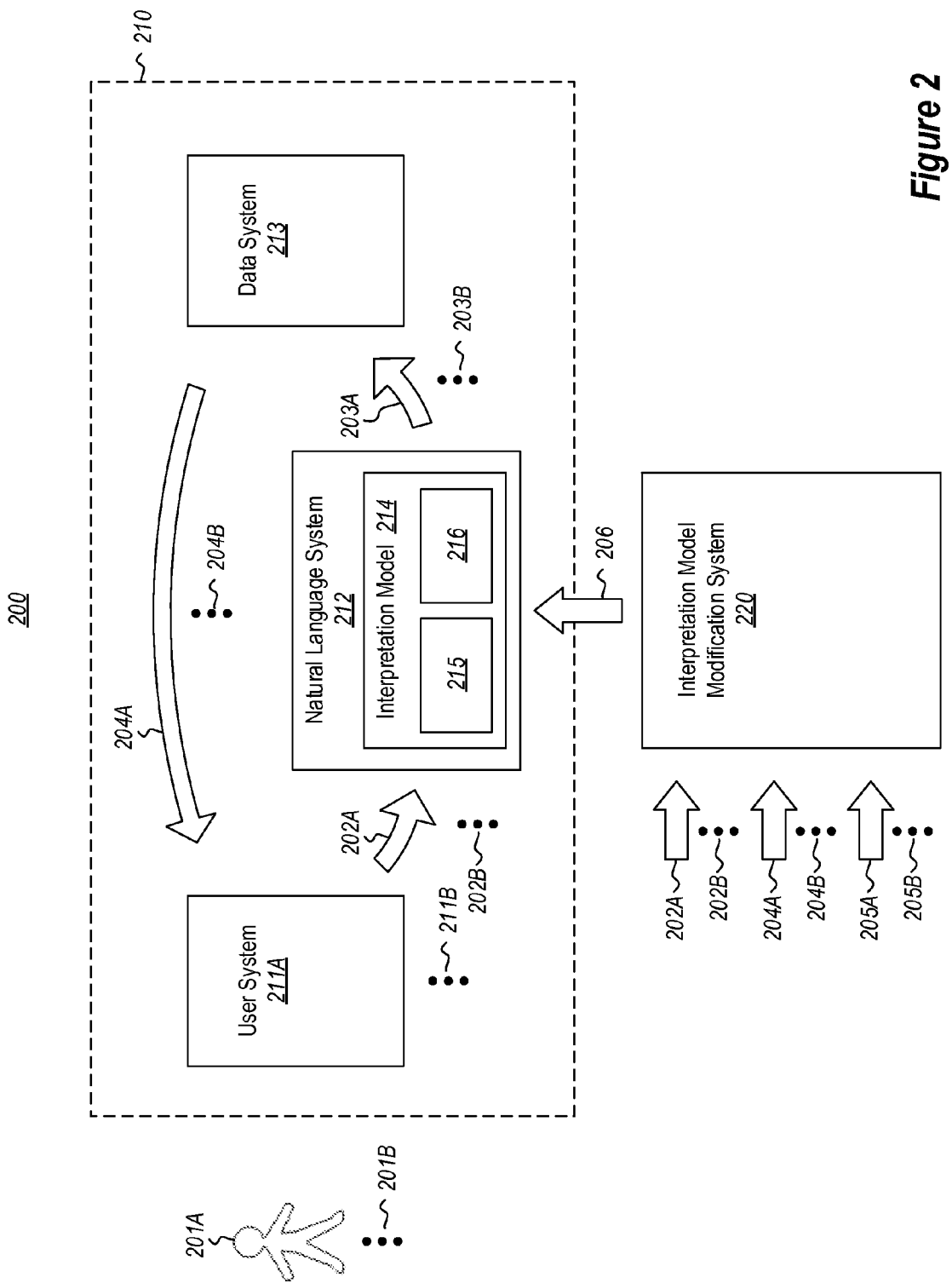
FIG. 2 abstractly illustrates an environment that includes a query system and an interpretation model modification system.

FIG. 2 abstractly illustrates an environment 200 that includes a query system 210 and an interpretation model modification system 220. The query system 210 includes a user system 211A at which a user 201A as well as potentially other users 201B (as represented by the ellipses) may enter natural language queries. The query system 210 may also include other user systems 211B (as represented by the ellipses) as well. For each of the other user systems 211B, one or more users may likewise enter natural language queries. The query system 210 also includes a natural language system 212 and a data system 213.

Hereinafter, whether there is a single user 201A using the query system 210, or whether there are multiple users (in which case the ellipses 201B represent one or more other users) using the query system 210, the one or more users of the query system 201 will also be referred to herein as "user(s) 201" or "querier(s) 201". Furthermore, whether there is a single user system 211A in the query system 210, or whether there are multiple user systems (in which case the ellipses 211B represent one or more other user systems) in the query system 210, the one or more user systems of the query system 210 will also be referred to herein as "user system(s) 211". Each of the user system(s) 211 may be structured as described above for the computing system 100, although appropriate user interfaces would also be included to allow the respective users to formulate the natural language query or queries. Furthermore, each of the natural language system 212, the data system 213 and the interpretation model modification system 220 may be structured as described above for the computing system 100 of FIG. 1.

The natural language system 212 receives the natural language queries generated by the user system(s) 211 in response to input by the user(s) 201. For instance, the natural language system 212 receives the natural language query 202A as well as potentially other natural language queries 202B as represented by the ellipses. Whether there is a single natural language query 202A processed by the query system 210, or whether there are multiple natural language queries (in which case the ellipses 202B represent one or more other natural language queries) processed by the query system 210, the one or more natural language queries processed by the query system 210 will also be referred to herein as "natural language query(s) 202".

As used in this description and in the claims, a "natural language query" is a query that does not follow the schema of a query directly interpretable by a data system 213. For instance, the data system 213 might be a database management system in which case the underlying data resides in a database. For instance, Structure Query Language (SQL) directly follows the schema of a database management system and thus may be directly interpreted by a database management system. Typically, a natural language query is a query that more closely follows the semantics and syntax of a user's everyday language (at least as compared to the schema interpretable by a database system). For instance, the following SQL query is typically not spoken in everyday language between colleagues at work:

"select AGE, SALARY
from EMPLOYEES
where 401KBalance>10000"

Furthermore, the user may not even be aware of the existence or names of the EMPLOYEE table, and might not know the existence or names of the available columns in that table.

The user might rather type or say "Show me the age and salary of all employees with a 401K balance greater than $10,000" or even more generally "May I have the critical statistics for everyone working for us that has a substantial retirement balance?" The natural language system would resolve the latter natural language query in an attempt to create a schematized query. The natural language system would encounter the term "critical statistics" and estimate what this means (e.g., does it mean age, gender, salary, position, or some combination?). The natural language system would also try to determine what "everyone working for us" means. For instance, this phrase might be found to be synonymous with "employee", which is the name of a table in the database. The natural language system would likewise try to determine what a "retirement balance" means, and perhaps equal that to a 401K balance. The natural language system would likewise try to determine what "substantial" means with respect to a 401K balance, and perhaps draw the distinction at $10,000.

The natural language system 212 use a natural language interpretation model 214 to interpret the query so as to reformulate the query into a schematized query 203A that is interpretable by the data system 213. The natural language interpretation model 214 may include a semantic model 215 and a syntactic model 216 to do so. The natural language interpretation model 214 might be uniformly applied to all users. However, in some embodiments, the natural language interpretation model 214 may differ down to the individual querier. For instance, one querier might user terms differently than another and intend different things. Even for common speakers of English, the term "acquire" might have different meaning depending on context. For instance, when someone says "show me all products acquired by John", some people might mean "show me all products purchased by John", meaning that John paid a price for the product. Other people might mean "show me all product groups for which John now has management responsibility over". It depends on the particular querier's natural language usage, which does differ from one person to another, even for those commonly considered to speak the same language and who are understandable to each other.

In any case, the data system 213 receives the schematized query 203A, as well as one or more potential other schematized queries 203B (as represented by the ellipses) in a form that matches the query schema used by the data system 213. Whether there is a single schematized query 203A used in the query system 210, or whether there are multiple schematized queries (in which case the ellipses 202B represent one or more other schematized queries) used in the query system 210, the one or more schematized queries used in the query system 210 will also be referred to herein as "schematized query(s) 203". The schematized query(s) 203 are generated by the natural language system 212 from the corresponding natural language query(s) 202.

The data system 213 returns a query result 204A and potentially one or more other query results 204B (as represented by the ellipses) back to the user system(s) 211 in response to the schematized query(s) 203. Whether there is a single query response 204A used in the query system 210, or whether there are multiple query responses (in which case the ellipses 204B represent one or more other query response) used in the query system 210, the one or more query response used in the query system 210 will also be referred to herein as "query response(s) 204".

Figure 3:
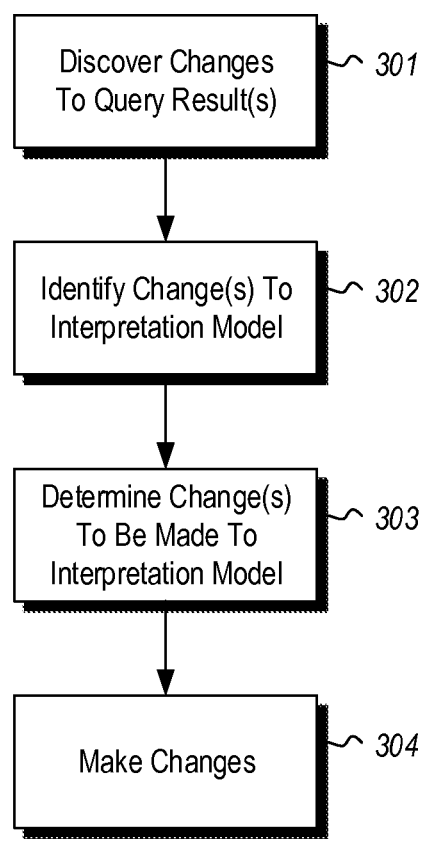
FIG. 3 illustrates a flowchart of a method for modifying a natural language interpretation model.

The interpretation model modification system 220 intelligently modifies the natural language interpretation model 214 for interpreting natural language query(s) 202. FIG. 3 illustrates a flowchart of a method 300 for modifying a natural language interpretation model. As the method 300 may be performed by the interpretation model modification system 220 to thereby modify the natural language interpretation model 214, the method 300 of FIG. 3 will now be described with frequent reference to the environment 200 of FIG. 2.

The interpretation model modification system discovers modifications (act 301) that one or more queriers made to one or more original query results of one or more natural language queries to generate one or more modified query results. In FIG. 2, for instance, the interpretation model modification system 220 discovers modifications that the querier(s) 201 made to the original query result(s) 204 of the natural language query(s) 202 to generate one or more modified query results.

To make this discovery, the interpretation model modification system 220 receives the query result(s) 204 and corresponding one or more modifications. For instance, the interpretation model modification system 220 discovers a modification 205A to the original query result(s) 204, but may also discover one or more additional modifications 205B (as represented by the ellipses) to the original query results(s) 204. Whether there is a single result modification 205A used by the interpretation model modification system 220, or whether there are multiple result modifications (in which case the ellipses 205B represent one or more other result modifications) used by the interpretation model modification system 220, the one or more result modifications used by the interpretation model modification system 220 will also be referred to herein as "modification(s) 205" or "result modification(s) 205.

The interpretation model modification system also identifies one or more changes (act 302) to a natural language interpretation model that would result in one or more query results that more accurately reflect the one or more modified query results (given the corresponding natural language query) as compared to the one or more original query results. For instance, in FIG. 2, the interpretation model modification system 220 determines changes that could be made to the natural language interpretation model 214 (such as changes to the semantic model 215 and/or to the syntactic model 216) that would result in query results that more closely matched the query results as modified by the querier(s) 201. In order to make this identification, the interpretation model modification system 220 also receives the natural language query(s) 202.

Note that the natural language query(s) 202 provided to the interpretation model modification system 220 need not be all of the natural language query(s) 202 submitted to the natural language system 212. For instance, the interpretation model modification system 220 might just sample those natural language queries. Accordingly, the query result(s) 204 provided to the interpretation model modification system 220 may be just those original query result(s) that corresponding to the natural language query(s) 202 provided to the interpretation model modification system 220.

The interpretation model modification system also determines (act 303) that at least one of the one or more changes is to be made to the natural language interpretation model. The interpretation model modification system then causes the change(s) to be made (act 304) to the natural language interpretation model. For instance, in FIG. 2, the interpretation model modification system 220 instructs the natural language system 212 to make the changes to the natural language interpretation model 214 (as represented by arrow 206). Accordingly, the next time a natural language query is made within similar semantics or syntax to the extent that the modifications to the model have an effect, the query results will more closely match the query results as modified (and thus hopefully match the query results as intended).

As for the determination that the changes are to be made (act 303), the interpretation model modification system 220 may consider whether an evidence threshold has been surpassed in determining whether a change should be made. That evidence threshold may vary depending on several factors.

For instance, the evidence threshold might tend higher if the interpretation model has high confidence in the portion of the interpretation model 214 that would be changed and that corresponds to the evidence threshold. For instance, if the interpretation model has high confidence that "goods" is synonymous with "products", the evidence threshold might be higher for determining that "goods" is not synonymous with "products".

As another example, the evidence threshold might tend higher depending on the querier scope of the change. For instance, as mentioned above, the natural language interpretation model 214 might apply a model that is unique to a given querier. If the natural language interpretation model 214 is only to be changed with respect to only a single querier, the evidence threshold might be lower. After all, individuals are free to speak or type in whatever language and using whatever terminology, semantics, or syntax they individually feel comfortable with. In the case of changes to the natural language interpretation model 214 as applied to a single querier, perhaps evidence is only used of modifications to query results made by that single querier.

On the other hand, perhaps groups of one or more queriers tend to use a slightly different set of semantics and syntax than other queriers even though all of the queries speak the same linguistic language (e.g., English). For instance, a term might mean one thing in a particular industry, and a completely different thing outside of the industry. Consider the English term "claim". That term might have different semantic meaning to a software engineer as compared to an attorney. Even within the field of law, the term "claim" may have different semantic meaning to a patent attorney as compared to a litigation attorney. Consider also the English term "virtual". There are numerous assigned semantics to this term depending on the group that is using the term, and even individuals within the same group might mean something slightly different when using the term. Different groups may also use different syntactic rules to construct sentences. For instance, there are regional dialects in almost every country in which syntactic rules vary from one dialect to another.

The evidence threshold for making interpretation model modifications might be higher for interpretation model changes that are applied to an entire group of queriers. Perhaps the evidentiary threshold also requires modifications to query results from a representative cross section of the entire group of queriers is used to make such changes. The evidentiary threshold might be higher still if the natural language interpretation model is to be applied more widely. For instance, the interpretation model 214 might be capable of interpreting natural language from a wide variety of languages (e.g., English, Mandarin, Spanish, Japanese, and so forth). It would be rare indeed that the interpretation model 214 would be changed across multiple such languages unless globally some word came into more frequent and universal usage (e.g., a company name). In some cases, the modifications made by the natural language modification system might include modifications to the evidence thresholds themselves.

In some embodiments, the query results may be in the form of a table. For instance, database queries typically return in table form. Changes to the table that might trigger modifications to the natural language interpretation model might include, for instance, the following: changing of one or more rows or one or more columns that are displayed; the application of one or more filters to the table to form the modified table; the application of one or more constraints to the table to form the modified table; the changing of transforms applied to values in cells in the table; the changing of values in the cell, and so forth.

A specific example will now be described in which the user 201A asks the user system 211A to "show the San Francisco employees". The query is then dispatched (as represented by arrow 202A) to the natural language system 212. The natural language system 212 uses its natural language interpretation model 214 to formulate a corresponding structural query that is directly interpretable by the data system 213. For instance, suppose the data system 213 directly interprets the SQL query format. The natural language system 212 might convert the natural language query "show the San Francisco employees" into the following SQL query:

select Employees.Name, Orders.ShipCity
    from Employees
    join Orders on Employees.ID=Orders.EmployeeID
    where Orders.ShipCity='San Francisco'

Figure 4:
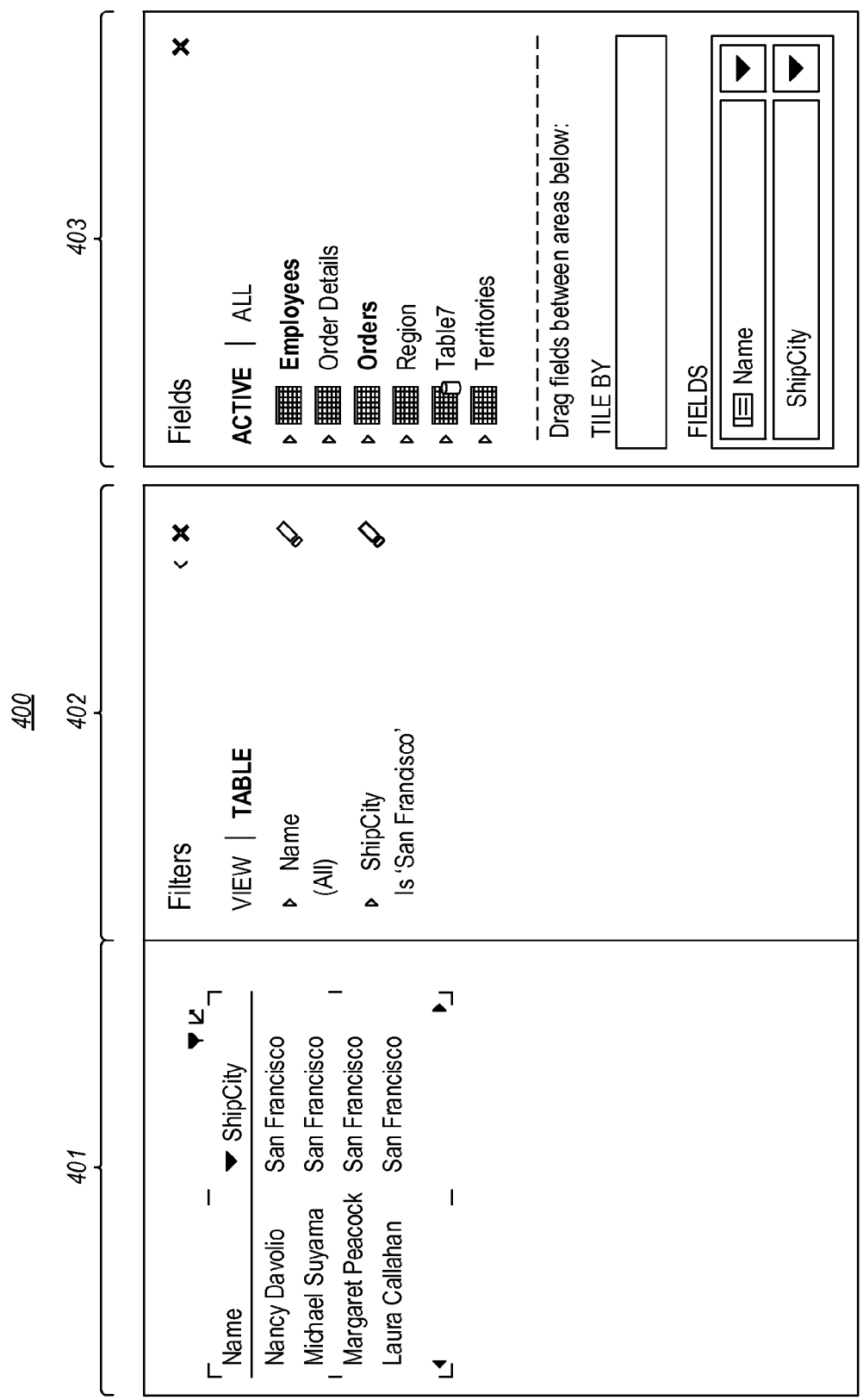
FIG. 4 illustrates a user interface that may initially appear in one example in which a user submits a natural language query to "show San Francisco employees", the user interface including a results table.

As a result of this query, the user might be displayed the user interface 400 of FIG. 4. The results table 401 illustrates a column for Name (corresponding to the employee ID field) and a ShipCity column Since the results were restricted by the ShipCity value of "San Francisco", there are only four names in the results table, all corresponding to the ShipCity of "San Francisco". Section 402 shows applied filters, and section 403 shows fields for this initial structural query.

Now suppose that the user 201A concludes this was not the desired answer to the natural language query, and consequently edits the result using the user interface 400 as follows: 1) removes the Orders.ShipCity column from the result table, 2) adds the Territories.TerritoryDescription column to the result table, and 3) changes the filter to compare "San Francisco" to the TerritoryDescription rather than to ShipCity. The underlying structural query submitted (as part of arrow 203A) to the data system 213 (assuming SQL is the language of the data system 213) might appear as follows:

select Employees.Name, Territories.TerritoryDescription
    from Employees
    join Territories on Employees.TerritoryID=Territories.ID
    where Territories.TerritoryDescription='San Francisco'

Figure 5:
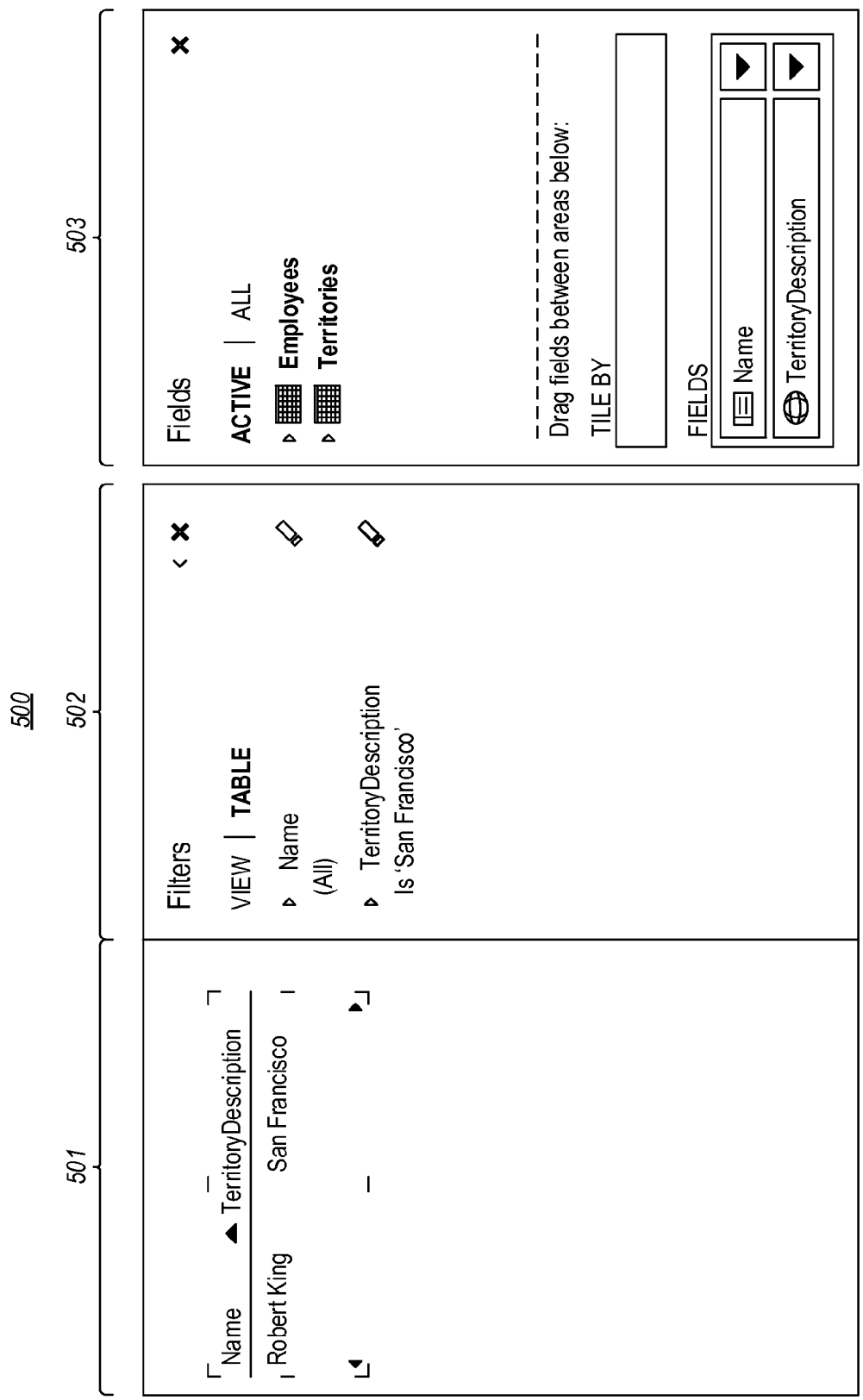
FIG. 5 illustrates a user interface that may next appear in response to user edits to the results table made to more closely match the intentions of the user, and from which the natural language system may modify its natural language model.

FIG. 5 illustrates a user interface 500 that may be presented after the user edits to the table. Note that the results table 501 is changed to include just one name which corresponds to the TerritoryDescription column having the value "San Francisco". The filters section 502 and the fields section 503 of the user interface 500 have likewise changed as compared to the filters section 402 and the fields section 403 of the user interface 400 of FIG. 4. Based on the combination of the original natural language query "show the San Francisco employees" and the user's alterations to the result table (and hence to the structured query), the natural language system would then learn to be biased toward interpreting city names associated with employees as TerritoryDescriptions rather than ShipCities.

Accordingly, a system is described in which a natural language system adjusts a natural language interpretation model as the system learns new semantics and syntax and otherwise adjusts the model. The adjustments can be made globally or as applied to a single querier or group. Furthermore, the evidentiary threshold (or "bias against change") may differ depending on the confidence that the model has in the proposed change.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more computer-readable storage media having stored thereon computer-executable instructions that are executable by one or more processors of a computer system to cause the computer system to modify a natural language interpretation model for natural language queries, the computer-executable instructions including instructions that are executable to cause the computer system to perform at least the following:
    receive a first natural language query from a querier;
    in response to receiving the first query, generate a first set of query results;
    send the first set of query results to the querier;
    receive a second query from the querier, the second query comprising a modified version of the first query that has been modified by the querier;
    in response to receiving the second query, generate a second set of query results;
    identify, within the second query, one or more modifications that the querier made to the first query;
    based on the one or more identified modifications that the querier made to the first query, identify one or more changes to a natural language interpretation model that would result in query results that more accurately reflect the second set of query results as compared to the first set of query results when receiving a query that is the same as the first query, at least one of the one or more identified changes being identified as only applying to a particular querier or a particular group of queriers, such that when modifications of the natural language interpretation model corresponding to the at least one of the one or more identified changes is made, the modifications will only be applied to the particular querier or the particular group of queriers, rather than to every querier that submits a query;
    modify, at a point in time, the natural language interpretation model with at least one of the one or more identified changes when at least one of the one or more identified changes surpasses an evidence threshold, wherein modifications that apply only to the particular group of queriers include a higher evidence threshold than modifications that apply either to all queriers or only to the particular querier;
    receive a third query that is the same as the first query after the point time; and
    in response to receiving the third query, and based at least on the third query having been received from the particular querier or from the particular group of queriers, generate the second set of query results using the modified natural interpretation model.

2. The computer program product in accordance with claim 1, at least one of the first set of query results comprising a table, and the second set of query results comprising a modified table.

3. The computer program product in accordance with claim 1, wherein the third query is received from a second querier who is a member of the particular group of queriers.

4. The computer program product in accordance with claim 1, wherein causing the natural language interpretation model to be modified comprises causing the natural language interpretation model to be modified only as applied to the particular querier or the particular group of queriers.

5. The computer program product in accordance with claim 1, wherein for each of a plurality of possible changes to the natural language interpretation model, identifying one or more changes to the natural language interpretation model comprises comparing an evidence threshold against corresponding modifications to the first set of query results, the evidence threshold not being the same for each of the plurality of possible changes to the natural language interpretation model.

6. The computer program product in accordance with claim 5, wherein for each of at least one of the plurality of possible changes to the natural language interpretation model, identifying one or more changes to the natural language interpretation model also comprises adjusting the evidence threshold for the corresponding possible change to the natural language interpretation model in accordance with a confidence of the natural language interpretation model on a model portion that would be changed by the corresponding change.

7. The computer system in accordance with claim 1, at least one of the first set of query results comprising a table, and the second set of query results comprising a modified table.

8. A method, implemented at a computer system that includes one or more processors, for modifying a natural language interpretation model for natural language queries, comprising:
receiving a first natural language query from a querier;
in response to receiving the first query, generating a first set of query results;
sending the first set of query results to the querier;
receiving a second query from the querier, the second query comprising a modified version of the first query that has been modified by the querier;
in response to receiving the second query, generating a second set of query results;
identifying, within the second query, one or more modifications that the querier made to the first query;
based on the one or more identified modifications that the querier made to the first query, identifying one or more changes to a natural language interpretation model that would result in query results that more accurately reflect the second set of query results as compared to the first set of query results when receiving a query that is the same as the first query, at least one of the one or more identified changes being identified as only applying to a particular querier or a particular group of queriers, such that when modifications of the natural language interpretation model corresponding to the at least one of the one or more identified changes is made, the modifications will only be applied to the particular querier or the particular group of queriers rather than to every querier that submits a query;
modifying, at a point in time, the natural language interpretation model with at least one of the one or more identified changes when at least one of the one or more identified changes surpasses an evidence threshold, wherein modifications that apply only to the particular group of queriers include a higher evidence threshold than modifications that apply either to all queriers or only to the particular querier;
receiving a third query that is the same as the first query after the point in time; and
in response to receiving the third query, and based at least on the third query having been received from the particular querier or from the particular group of queriers, generating the second set of query results using the modified natural language interpretation model.

9. The method in accordance with claim 8, at least one of the first set of query results comprising a table, and the second set of query results comprising a modified table.

10. The method in accordance with claim 9, a modification causing the table to be modified to the modified table comprising:
changing one or more rows that are displayed.

11. The method in accordance with claim 9, a modification causing the table to be modified to the modified table comprising:
changing one or more columns that are displayed.

12. The method in accordance with claim 9, a modification causing the table to be modified to the modified table comprising:
applying one or more filters to the table to form the modified table.

13. The method in accordance with claim 9, a modification causing the table to be modified to the modified table comprising:
applying one or more constraints to the table to form the modified table.

14. The method in accordance with claim 9, a modification causing the table to be modified to the modified table comprising:
changing transforms applied to values in cells in the table.

15. The method in accordance with claim 9, a modification causing the table to be modified to the modified table comprising:
changing values in cells in the table.

16. The method in accordance with claim 9, at least one of the one or more changes comprising a change to a semantic model of the natural language interpretation model.

17. The method in accordance with claim 9, at least one of the one or more changes comprising a change to a syntactic model of the natural language interpretation model.

18. The method in accordance with claim 8, wherein the third query is received from a second querier who is a member of the particular group of queriers.

19. A computer system comprising:
one or more processors;
one or more computer-readable storage media having thereon computer-executable instructions that are executable by the one or more processors to cause the computer system to modify a natural language interpretation model for natural language queries, the computer-executable instructions including instructions that are executable to cause the computer system to perform at least the following:
receive a first natural language query from a querier;
in response to receiving the first query, generate a first set of query results;
send the first set of query results to the querier;
receive a second query from the querier, the second query comprising a modified version of the first query that has been modified by the querier;
in response to receiving the second query, generate a second set of query results;
identify, within the second query, one or more modifications that the querier made to the first query;
based on the one or more identified modifications that the querier made to the first query, identify one or more changes to a natural language interpretation model that would result in query results that more accurately reflect the second set of query results as compared to the first set of query results when receiving a query that is the same as the first query, at least one of the one or more identified changes being identified as only applying to a particular querier or a particular group of queriers, such that when modifications of the natural language interpretation model corresponding to the at least one of the one or more identified changes is made, the modifications will only be applied to the particular querier or the particular group of queriers rather than to every querier that submits a query;

modify, at a point in time, the natural language interpretation model with at least one of the one or more identified changes when at least one of the one or more identified changes surpasses an evidence threshold, wherein modifications that apply only to the particular group of queriers include a higher evidence threshold than modifications that apply either to all queriers or only to the particular querier;

receive a third query that is the same as the first query after the point in time; and in response to receiving the third query, and based at least on the third query having been received from the particular querier or from the particular group of queriers, generate the second set of query results using the modified natural interpretation model.

\* \* \* \* \*